M. TIBBETTS.
MOTOR VEHICLE.
APPLICATION FILED DEC. 9, 1912.

1,200,781.

Patented Oct. 10, 1916.

WITNESSES
Milo L. Bailey

INVENTOR
Milton Tibbetts

UNITED STATES PATENT OFFICE.

MILTON TIBBETTS, OF DETROIT, MICHIGAN, ASSIGNOR TO PACKARD MOTOR CAR COMPANY, OF DETROIT, MICHIGAN, A CORPORATION OF MICHIGAN.

MOTOR-VEHICLE.

1,200,781.

Specification of Letters Patent.

Patented Oct. 10, 1916.

Application filed December 9, 1912. Serial No. 735,730.

*To all whom it may concern:*

Be it known that I, MILTON TIBBETTS, a citizen of the United States, and resident of Detroit, Wayne county, State of Michigan, have invented certain new and useful Improvements in Motor-Vehicles, of which the following is a specification.

This invention relates to motor vehicles, and particularly to the road wheels, their mounting on the axle, and the indicator driving mechanism which is driven by the road wheels for indicating the speed or distance traveled.

One of the foremost objects of the invention is the production of a suitable driving mechanism for an indicator, such as a speedometer or odometer, in conection with a road wheel that has its hub formed with a spindle which extends inwardly and is mounted in a hollow suporting member.

Figure 2:
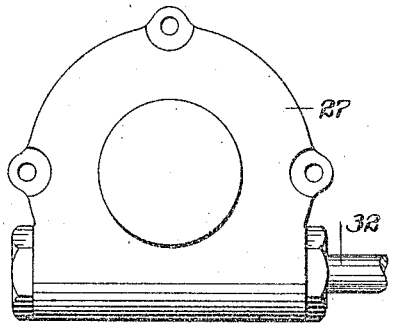
Figure 3:
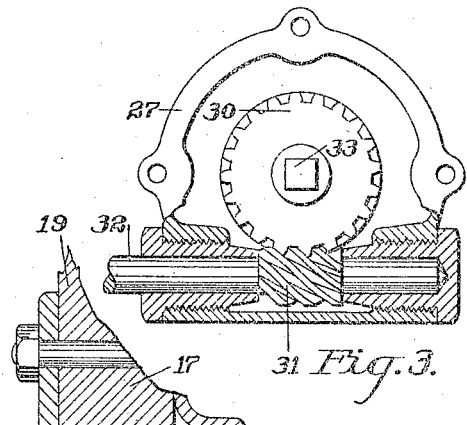
Figure 1:
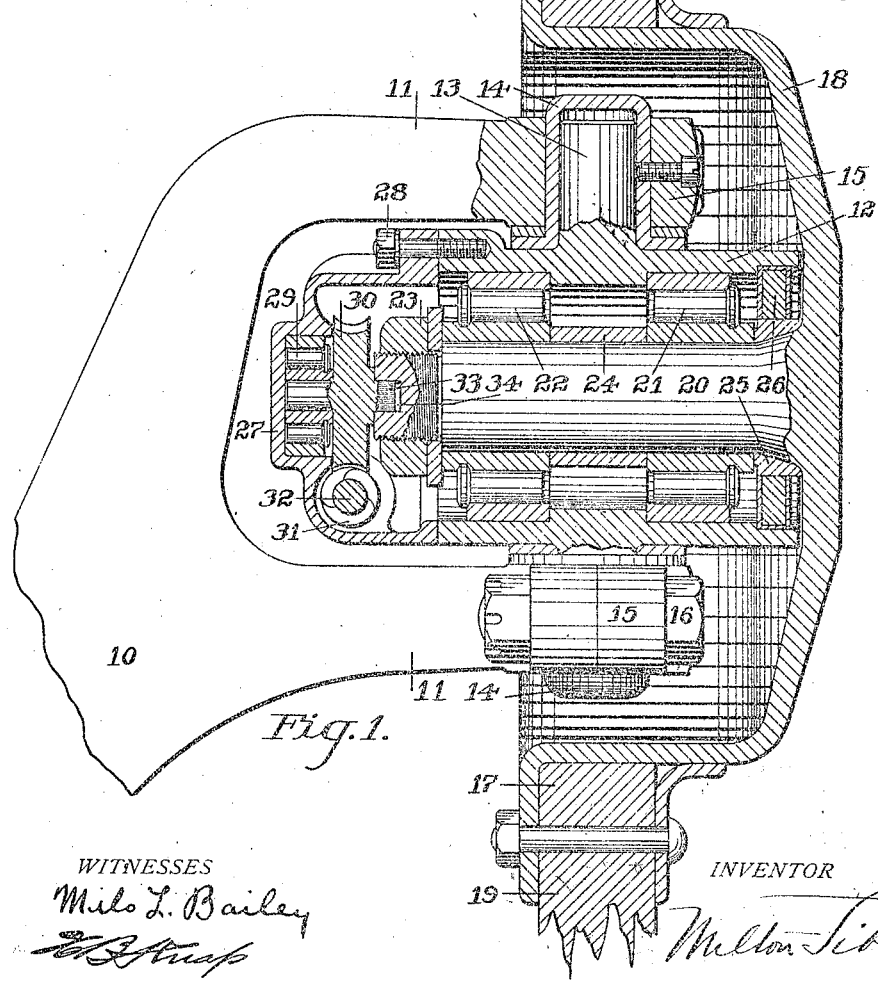

Other objects of the invention will be apparent from the following description, taken in connection with the drawings, which form a part of this specification, and in which, Figure 1 is a vertical section through one of the front steering wheels of a motor vehicle, and the contiguous parts of the axle; Fig. 2 is an external end view of the cap arranged on the wheel support; and Fig. 3 is an internal end view of said cap with parts broken away.

Referring to the drawings, 10 represents one of the ends of an axle of a motor vehicle, which end is branched, and between the arms 11 of which is arranged a wheel support 12. The wheel support is preferably of barrel shape, having integral trunnions 13, which are adapted to oscillate in bushings 14 secured in the ends of the arms 11 by removable caps 15. One of these caps 15 is shown in section in Fig. 1, and the other cap is shown in elevation, and bolts 16 are shown as holding the caps in position.

A vehicle wheel 17 is shown as formed with a hub member 18, to which the spokes 19 are secured, and said hub has an integral or otherwise formed spindle 20, which extends inwardly and is supported in a pair of separated roller bearings 21 and 22 in the wheel support 12. These bearings are of such form that one of them takes the thrust in one direction and the other in the other direction, and they are secured in place on the spindle 20 by a securing nut 23, which is threaded on the inner end of the spindle.

A ring 24 separates the bearings on the spindle, and a washer 25 forms an abutment for the bearings at the outer end of the spindle. This washer is also surrounded by a packing ring 26, which prevents the escape of lubricant and the ingress of dust or dirt. The inner end of the wheel support or barrel 12 is covered by a bracket or cap 27, which is secured to the support 12 by a series of bolts 28, these bolts being three in number in the embodiment of the invention shown.

Mounted in bearings 29 in the cap 27 and concentrically arranged with the spindle 20, is a worm wheel 30 which meshes with a worm 31 on an indicator driving shaft 32, this gearing and shafting constituting an indicator drive mechanism, the shaft 32 being adapted to drive an indicator of suitable form, such as a speedometer or odometer. Preferably this indicator is mounted on the dash or other part of the vehicle, and is operatively connected to the shaft 32 by means of a flexible shaft of suitable design.

The worm wheel 30 is arranged to be driven by the spindle 20 as it rotates, and in the drawing this is shown as a direct connection, a squared extension 33 of the axle of the wheel 30 entering a squared opening 34 in the inner end of the spindle 20. This connection need not be a very close fit, and in fact should be loose enough to allow for any slight error in machining that may occur in manufacture.

While a specific embodiment of the invention has been described in detail, which embodiment is deemed to be new and advantageous and will be specifically claimed, yet it will be understood that the invention is not limited to the exact construction shown, as it will be apparent that changes may be made without departing from the spirit and scope of the invention.

Having thus described my invention, what I claim and desire to secure by Letters Patent, is:

1. In a motor vehicle, the combination with the axle, a wheel support pivoted to the axle and comprising a hollow member, and a wheel having a supporting spindle rotatably mounted in said support, of an indicator driving mechanism connected with said spindle, and having a driven shaft leading therefrom and adapted to drive an indicator.

2. In a motor vehicle, the combination with the axle, a wheel support pivoted to the axle and comprising a hollow member, and a wheel having a supporting spindle rotatably mounted in said support, of an indicator driving mechanism mounted on said support and having a driving connection with said spindle, and a driven shaft leading from the mechanism, said driven shaft being adapted to drive an indicator.

3. In a motor vehicle, the combination with the axle, a wheel support pivoted to the axle and comprising a hollow member, and a wheel having a supporting spindle rotatably mounted in said support, of a cap for closing the inner end of said support, an indicator driving mechanism mounted in said cap, and a driving connection from said spindle to said mechanism.

4. In a motor vehicle, the combination with the axle thereof, of a cylindrical wheel support having substantially vertical trunnions in said axle, a wheel having a supporting spindle extending into said support, bearings between said spindle and said support, an indicator driving mechanism mounted on said support, a driving connection between said spindle and said mechanism.

5. In a motor vehicle, the combination with the axle thereof, of a cylindrical wheel support having substantially vertical trunnions in said axle, a wheel having a supporting spindle extending into said support, bearings between said spindle and said support, a cap over the inner end of said support, an indicator driving mechanism supported by said cap, a driving connection directly from the end of said spindle to said mechanism and a driven shaft leading away from said mechanism and adapted to drive an indicator.

6. In a motor vehicle, the combination with the axle, a wheel support pivoted to the axle and comprising a hollow member, and a wheel having a supporting spindle rotatably mounted in said support, of a cap for closing the inner end of said support, an indicator driving mechanism mounted in said cap, and including a shaft passing outwardly through the cap, and a driving connection from said spindle to said mechanism.

In testimony whereof I affix my signature in the presence of two witnesses.

MILTON TIBBETTS.

Witnesses:
Milo T. Bailey,
Le Roi J. Williams.